(12) United States Patent
Jung et al.

(10) Patent No.: US 10,967,710 B2
(45) Date of Patent: Apr. 6, 2021

(54) SYSTEM AND METHOD FOR CONTROLLING COMPRESSOR OF VEHICLE

(71) Applicants: Hyundai Motor Company, Seoul (KR); Kia Motors Corporation, Seoul (KR)

(72) Inventors: Tae Hun Jung, Seoul (KR); Jeong Sik Seo, Hwaseong-si (KR); Jaeyeon Moon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 92 days.

(21) Appl. No.: 16/159,379

(22) Filed: Oct. 12, 2018

(65) Prior Publication Data
US 2019/0389279 A1    Dec. 26, 2019

(51) Int. Cl.
*B60H 1/32*    (2006.01)
*F25B 49/02*   (2006.01)

(52) U.S. Cl.
CPC ......... *B60H 1/3208* (2013.01); *B60H 1/3216* (2013.01); *F25B 49/022* (2013.01); *B60H 2001/3238* (2013.01); *B60H 2001/3266* (2013.01); *B60H 2001/3273* (2013.01); *B60H 2001/3275* (2013.01)

(58) Field of Classification Search
CPC .............. B60H 1/3208; B60H 1/00735; B60H 1/00764; B60H 1/00771; B60H 1/00978; B60H 1/3216; B60H 2001/3248; B60H 2001/3266; B60H 2001/3273; F25B 49/022

See application file for complete search history.

(56) References Cited

U.S. PATENT DOCUMENTS

| | | | |
|---|---|---|---|
| 5,967,628 A * | 10/1999 | Abe .......................... | B60T 7/12 188/353 |
| 6,027,184 A * | 2/2000 | Yonemura ................. | B60T 7/12 303/11 |
| 6,729,148 B2 | 5/2004 | Wakisaka et al. | |

(Continued)

FOREIGN PATENT DOCUMENTS

KR    10-2007-0028938 A    3/2007

*Primary Examiner* — Jonathan Bradford
(74) *Attorney, Agent, or Firm* — Morgan, Lewis & Bockius LLP (57) ABSTRACT

A system for controlling a compressor may include an engine controller controlling a fuel injection amount corresponding to an engine load and an opening amount of a throttle by reflecting a required torque required for an air conditioner, an operation information detector for detecting operation information according to driving state of the vehicle, a compressor generating pressure through a piston operation of a cylinder utilizing the power of the engine during operation of the air conditioner, and a controller determining an engine negative pressure of an intake manifold stored in the brake booster at a value, and when the negative pressure of intake manifold is below a first threshold value when the brake is operated, the engine enters a negative pressure recovery mode for predicting an insignificant negative pressure drop condition that falls below a second threshold value which is the A/C cut control condition and reduces the A/C duty.

19 Claims, 9 Drawing Sheets

(56) References Cited

U.S. PATENT DOCUMENTS

| | | | |
|---|---|---|---|
| 7,478,537 B2 | 1/2009 | Makishima et al. | |
| 2009/0292449 A1* | 11/2009 | Yamazaki | B60K 6/445 |
| | | | 701/103 |
| 2015/0291004 A1* | 10/2015 | Watanabe | F04B 49/20 |
| | | | 417/34 |

* cited by examiner

| Immediately before the negative pressure recovery control A/C Duty Output value [%] | Required torque control amount [Nm] |
|---|---|
| 100 | 3.5 |
| 80 | 3.0 |
| 70 | 2.5 |
| 60 | 2.0 |
| 50 | 1.5 |
| 40 | 0.0 |

FIG. 7

| Immediately before the negative pressure recovery control A/C Duty Output value [%] | Required torque control amount [Nm] |
|---|---|
| 100 | CR_Fatc_TqAcnOut * 0.50 |
| 80 | CR_Fatc_TqAcnOut * 0.50 |
| 70 | CR_Fatc_TqAcnOut * 0.40 |
| 60 | CR_Fatc_TqAcnOut * 0.30 |
| 50 | CR_Fatc_TqAcnOut * 0.20 |
| 40 | 0.0 |

FIG. 9

SYSTEM AND METHOD FOR CONTROLLING COMPRESSOR OF VEHICLE

CROSS-REFERENCE TO RELATED APPLICATION

The present application claims priority to Korean Patent Application No. 10-2018-0085891 filed on Jul. 24, 2018, the entire contents of which is incorporated herein for all purposes by this reference.

BACKGROUND OF THE INVENTION

Field of the Invention

The present invention relates to a system and method for controlling a compressor of a vehicle. More particularly, the present invention relates to a system and method for controlling a compressor of a vehicle which is applied to an air conditioner of a vehicle and variably controlled according to brake negative pressure conditions.

Description of Related Art

In the conventional vehicle, when the brake negative pressure stored in the brake booster is insufficient, the brake pedal becomes hard and the risk of the accident becomes high. To solve the present problem, the logic that recovers the brake negative pressure by stopping the operation of auxiliary devices such as air conditioners such as air conditioner (A/C) is applied in the situation where the brake negative pressure is insufficient.

For example, a compressor applied to an air conditioner affects the engine load during operation due to the nature of the power of the engine, and when the brake negative pressure falls, there arises a problem in brake operation. Therefore, when the negative pressure of the brake drops to a certain value or less, the demand power is secured by stopping the air conditioner operation (hereinafter referred to as "A/C CUT").

Here, the brake negative pressure means a value directly measured by mounting a sensor in the brake booster with the pressure stored in the actual brake booster. However, in many manufacturers, instead of mounting the sensor on the actual brake booster due to the problem of rising cost, the difference between the atmospheric pressure and the intake manifold pressure (hereinafter referred to as "the negative pressure of intake manifold") is used.

Figure 1:
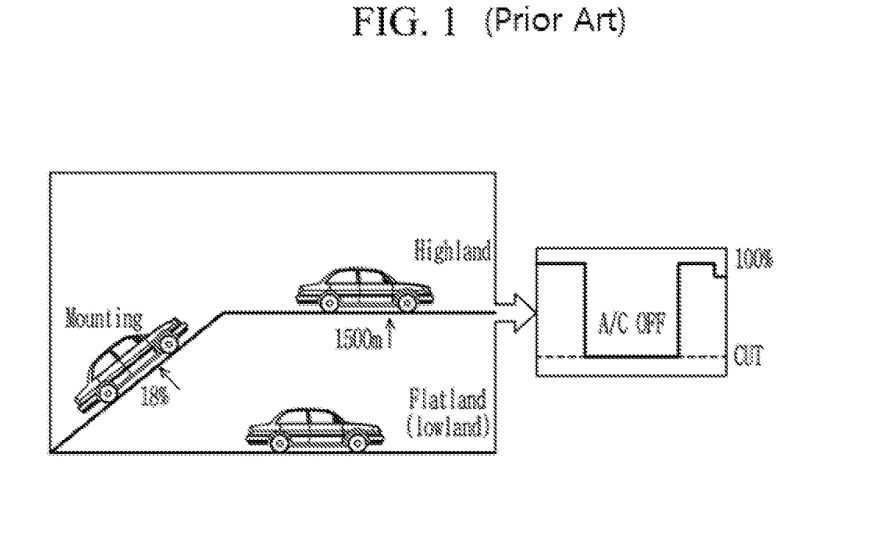
FIG. 1 is a conceptual diagram showing an A/C CUT logic using a conventional negative pressure of an intake manifold.

FIG. 1 is a conceptual diagram showing an A/C CUT logic using a conventional negative pressure of an intake manifold.

Referring to FIG. 1, the A/C CUT logic using the conventional negative pressure of the intake manifold is that if the negative pressure drops below a certain value regardless of the state of driving uphill, the highland (e.g., over 1500 m), and the flatland (lowland), and other vehicle driving conditions meet the criteria, A/C cut is generated.

However, the negative pressure of the intake manifold is not a measured value but a determined value, and therefore, the difference between the atmospheric pressure and the negative pressure is determined to be smaller than the actual brake booster and the A/C cut is generated despite the fact that enough negative pressure is stored in the actual brake booster. These side effects cause frequent occurrence of A/C cut, leading to a decrease in cooling performance and generation of windshield moisture, resulting in a customer complaint.

On the other hand, when the A/C cut entry condition is set up according to the negative pressure of the intake manifold to reduce the A/C cut frequency, there is a trade-off problem in which a customer complaint occurs due to a decrease in braking performance. Furthermore, when the A/C cut entry condition is set upward, there is a problem that the power performance of the engine deteriorates due to the A/C ON under the condition of driving uphill, which requires a lot of engine torque.

Therefore, there is a desperate need to solve the trade-off problem of cooling performance, braking performance, and power performance in the conventional A/C cut control logic using negative pressure of the intake manifold.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method for controlling a compressor of a vehicle which increases the negative pressure of an intake manifold by decreasing the engine load by causing the A/C duty to be varied and the required torque accordingly to be decreased in a situation where the manifold pressure during the braking operation of the vehicle is insufficient.

According to an exemplary embodiment of the present invention, a system for controlling a compressor of a vehicle may include an engine controller (ECU) that controls a fuel injection amount corresponding to an engine load and an opening amount of a throttle by reflecting a required torque required for an air conditioner (A/C), an operation information detector for detecting operation information according to the driving state of the vehicle, a compressor that generates pressure through a piston operation of a cylinder utilizing the power of the engine during operation of the air conditioner (A/C), and a controller which determines an engine negative pressure of an intake manifold stored in the brake booster at a value obtained by subtracting the engine pressure from the atmospheric pressure detected by the operation information detector, and when the negative pressure of intake manifold is below a first threshold value when the brake is operated, the engine enters a negative pressure recovery mode for predicting an insignificant negative pressure drop condition that falls below a second threshold value which is the A/C cut control condition and reduces the A/C duty of the compressor.

Furthermore, the compressor may include a pressure regulator for regulating an operation rate of the piston by changing the angle of the swash plate in accordance with the A/C duty control signal applied from the controller.

Furthermore, the system for controlling a compressor of a vehicle may further include a memory for storing an A/C duty control map for variable A/C duty control of the compressor and a required torque control map corresponding to the A/C duty control map in the case of insignificant negative pressure of the intake manifold.

Furthermore, the operation information detector may detect at least one operation information among the air conditioner operation state, vehicle speed, atmospheric pressure, inflation pressure, accelerator pedal operation state, brake operation state, sea level, road inclination, and a timer.

Furthermore, the controller may enter negative pressure recovery mode when the vehicle is running at a low speed condition less than a predetermined vehicle speed at which the vehicle is not completely stopped based on the operation information, the negative pressure of the intake manifold is less than the first threshold value, the accelerator pedal is not operated, and the brake is operated.

Furthermore, the controller may reduce the basic A/C duty according to the entry into the negative pressure recovery mode to the minimum A/C duty for a predetermined time period to reduce the engine load and then return to the basic A/C duty.

Furthermore, the controller may smoothly control the variation rate of the release slope returning to the basic A/C duty compared to the change rate of the entering slope which is reduced to the minimum (min) A/C duty during the present time upon entering the negative pressure recovery mode.

Furthermore, the controller may prohibit re-entry into the negative pressure recovery mode within a predetermined re-entry prohibition time period after returning to the basic A/C duty.

Furthermore, the controller may perform the required torque control to determine the required torque reduction amount of the compressor simultaneously with the A/C duty reduction control and send it to the ECU when entering the negative pressure recovery mode.

Furthermore, the controller, by referring to the first required torque control table in which the required torque control amount which may be reduced to the minimum (min) output is quantitatively different in correspondence with the output value (max) for each A/C duty immediately before entering the negative pressure recovery mode, may output the reduced torque demand to the ECU by subtracting the first required torque control amount corresponding to the output value.

Furthermore, the controller, by referring to the second required torque control table in which the required torque control amount which may be reduced to the minimum (min) output is quantitatively different in correspondence with the output value (max) for each A/C duty immediately before entering the negative pressure recovery mode, may output the reduced torque demand to the ECU by subtracting the second required torque control amount corresponding to the output value.

Furthermore, the controller may select a large value among the first required torque control amount and the second required torque control amount, and transmits the reduced torque demand to the ECU.

Furthermore, the controller may restrict the entry into the negative pressure recovery mode when the vehicle is in a state of driving uphill at a predetermined inclination or more or at a highland higher than a predetermined altitude.

Furthermore, the controller variably may set the first threshold to increase as the altitude at which the vehicle is located at a flatland below a predetermined altitude to shorten the point of entry of negative pressure recovery mode.

Meanwhile, a method for controlling a compressor of a vehicle variably controlling according to brake negative pressure condition of vehicle compressor control system may include a) controlling the compressor with a set basic A/C duty when the air conditioner (A/C) of the vehicle is operated, b) determining the negative pressure of the intake manifold stored in the brake booster at a value obtained by collecting the operation information according to the running state of the vehicle and subtracting the intake manifold pressure from the atmospheric pressure, c) entering the negative pressure recovery mode when the braking operation is in a state where the negative pressure of the intake manifold is less than the first threshold value, and d) performing negative pressure recovery control for reducing the engine load by reducing the basic A/C duty according to the entry into the negative pressure recovery mode to a minimum A/C duty for a predetermined time period.

Furthermore, the step c) may include entering the negative pressure recovery mode when the vehicle is running at a low speed condition less than a predetermined vehicle speed at which the vehicle is not completely stopped based on the operation information, the accelerator pedal is not operated, and the brake is operated.

Furthermore, the step c) may further include entering the negative pressure recovery mode if the fluctuation rate of the negative pressure of the intake manifold detected during a predetermined time period is abruptly changed to be equal to or greater than the third threshold value even if the condition in which the negative pressure of the intake manifold is not more than the first threshold is not satisfied.

Furthermore, the step d) may include performing the required torque control to determine the required torque reduction amount of the compressor simultaneously with the A/C duty reduction control and send it to the ECU when entering the negative pressure recovery mode.

Furthermore, performing the required torque control may include subtracting a first required torque control amount which is quantitatively differentiated according to an output value (max) for each A/C duty immediately before entering the negative pressure recovery mode, and transmitting the reduced required torque, or subtracting a first required torque control amount which is proportionally differentiated according to an output value (max) for each A/C duty immediately before entering the negative pressure recovery mode, and transmitting the reduced required torque, or determining the first required torque control amount and the second required torque control amount, subtracting a larger value therefrom, and transmitting the reduced required torque.

Furthermore, the method for controlling a compressor of a vehicle may further include after the step d), canceling the negative pressure recovery mode entry and returning to the basic A/C duty control after the time period of the negative pressure recovery mode has passed, prohibiting re-entry into the negative pressure recovery mode within a predetermined re-entry prohibition time period after returning to the basic A/C duty control, and entering the negative pressure recovery mode if the negative pressure of the intake manifold is less than the first threshold value regardless of the braking operation for a certain time period after the re-entry prohibition time period.

According to an exemplary embodiment of the present invention, it is possible to reduce the frequency of A/C cut due to insufficient negative pressure of the intake manifold and solve the cooling performance problem accordingly by detecting the condition that the negative pressure of the intake manifold is insufficient, securing the negative pressure of the intake manifold through the pre-A/C duty reduction control and the reduction of the required torque.

Furthermore, the braking performance may be improved by controlling the A/C duty reduction control when the engine enters the negative pressure recovery mode and adjusting the variable torque demand value and the variable speed of the A/C duty of the compressor, increasing the negative pressure of the intake manifold.

Furthermore, by omitting the brake booster sensor and using the difference between the atmospheric pressure and the pressure of the intake manifold, it is possible to reduce the cost increase and improve the customer satisfaction by improving the trade-off relationship between the cooling performance and the brake performance.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" or variations such as "comprises" or "comprising" will be understood to imply the inclusion of stated elements but not the exclusion of any other elements. In addition, the terms "-er", "-or" and "module" described in the specification mean units for processing at least one function and operation and may be implemented by hardware components or software components and combinations thereof.

Furthermore, to effectively describe technical characteristics of the present invention, the following exemplary embodiment of the present invention may appropriately change, integrate, or separate terms to be clearly understood by a person of ordinary skill in the art, and the present invention is not limited thereto.

Throughout the specification, the negative pressure of the intake manifold refers to a determined value that estimates the negative brake negative pressure stored in the brake booster at a value obtained by subtracting the Intake Manifold pressure from the atmospheric pressure. Therefore, "negative pressure" in the exemplary embodiment of the present invention means "negative pressure of the intake manifold", not booster negative pressure, unless otherwise specified.

It may be noted that the system and method for controlling the compressor of the present invention described below are distinguished from those of the conventional technology in which the sensor for measuring the negative pressure of the brake is solved due to the characteristics of solving the problem of using the negative pressure of the intake manifold.

Now, a system and method for controlling a compressor according to an exemplary embodiment of the present invention will be described in detail with reference to the drawings.

Figure 2:
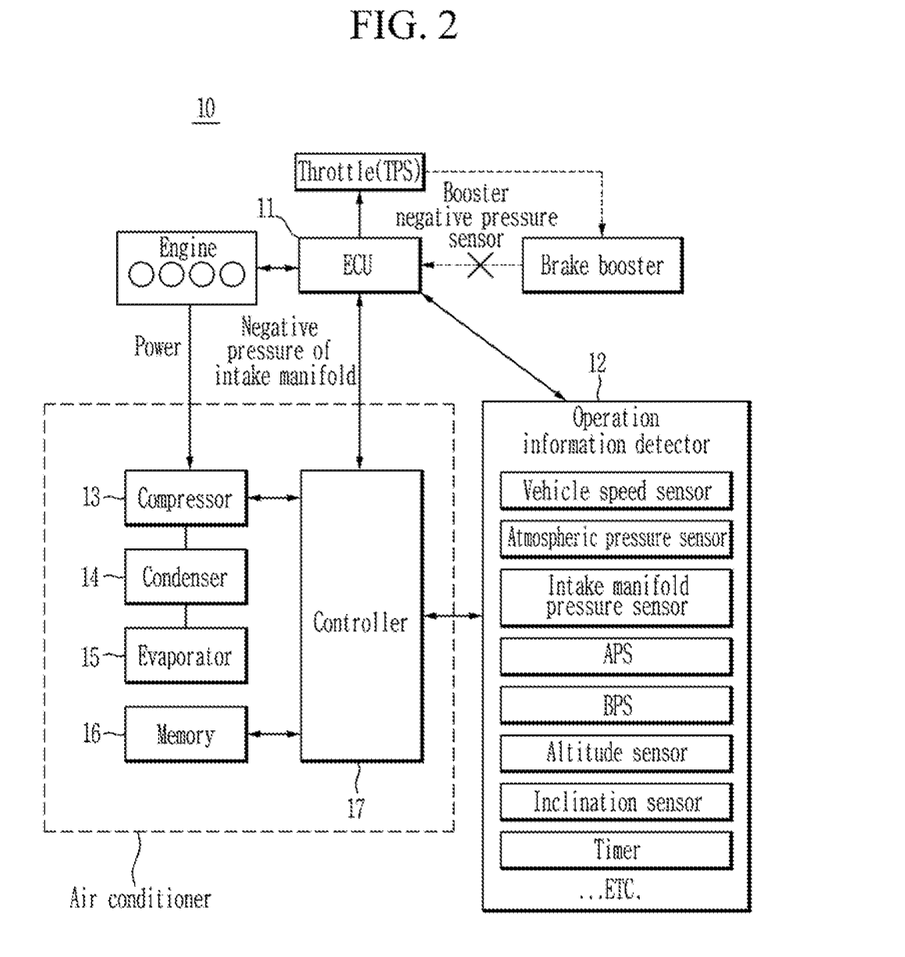
FIG. 2 schematically shows a system for controlling a compressor according to an exemplary embodiment of the present invention.

FIG. 2 schematically shows a system for controlling a compressor according to an exemplary embodiment of the present invention.

Figure 3:
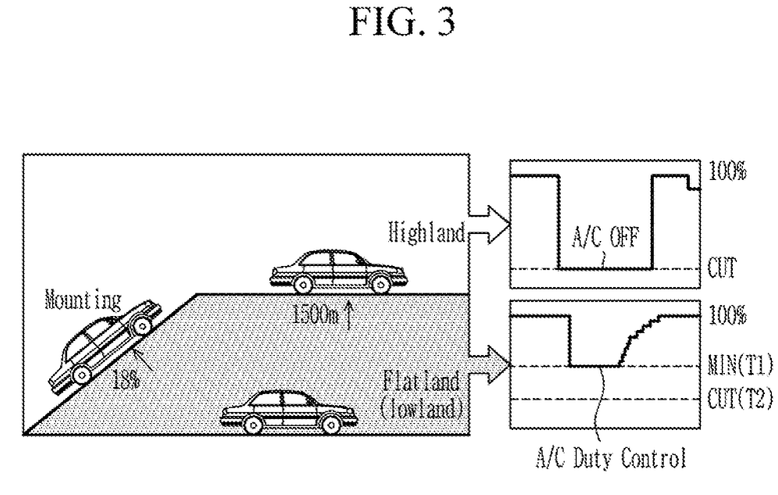
FIG. 3 is a conceptual diagram illustrating variable-compressor control logic according to an exemplary embodiment of the present invention.

FIG. 3 is a conceptual diagram illustrating variable-compressor control logic according to an exemplary embodiment of the present invention.

Referring to FIG. 2 and FIG. 3, a system for controlling a compressor 10 according to an exemplary embodiment of the present invention includes an engine control unit (ECU) 11, an operation information detector 12, a compressor 13, a condenser 14, an evaporator 15, a memory 16 and a controller 17.

Before describing the present invention in full, the operation of the system for controlling the compressor 10 according to the exemplary embodiment of the present invention will be described with respect to the peripheral device on the characteristic of using the negative pressure which is not the brake negative pressure measured by the actual sensor.

Normally, the brake booster stores negative pressure to mechanically amplify the force the driver is stepping on the brake pedal and, when the brake pedal is actuated, transfers pressure to the brake for vehicle braking.

At the instant time, the source of the pressure used by the brake booster is the negative pressure of the intake manifold which is the difference between the atmospheric pressure and the intake manifold pressure. The negative pressure of the intake manifold is larger when the throttle (TPS) is closed due to the negative pressure and the throttle and smaller when the throttle is opened. Furthermore, when the driver depresses the accelerator pedal to open the throttle (TPS), the atmospheric pressure and the intake manifold pressure become equal to each other due to the inflow of air, so that the negative pressure of the intake manifold approaches zero. For the present reason, despite the fact that enough negative pressure is stored in the actual brake booster, the negative pressure of the intake manifold is determined to be small, which has the side effect of causing frequent A/C cuts.

Accordingly, the system for controlling the compressor 10 according to the exemplary embodiment of the present invention monitors and predicts a situation in which the negative pressure of the intake manifold, which is a source for supplying pressure to the brake booster, is insufficient below a certain threshold value, and prevents the above-mentioned side effects.

The ECU 11 is a computing device that controls the overall operation for driving the engine, and controls the fuel injection amount according to the operation of auxiliary devices of the engine (compressor, alternator, etc.) so that the engine may be operated at a stable RPM.

The throttle opening amount TPS is controlled according to the fuel injection amount control of the ECU 11. As the fuel injection amount increases, the opening amount of the throttle (TPS) becomes larger and the fuel injection amount decreases, the opening amount of the throttle (TPS) becomes smaller.

When the opening amount of the throttle (TPS) is increased, the negative pressure of the intake pressure which is the difference between the atmospheric pressure and the intake manifold pressure becomes small. At the instant time, the ECU 11 receives a signal indicating that the negative pressure of the intake manifold is insufficient and moves the throttle in the closing direction thereof.

Conventionally, there are various methods of moving the throttle (TPS) in the closing direction thereof. However, in general, a method of stopping the operation of the auxiliary device may be used. Typically, the A/C cut control is used to stop the compressor 13 for a few seconds with a small side effect due to a relatively instantaneous OFF. The A/C cut can reduce the engine load, moving the throttle (TPS) in the closing direction to promote the rise of the negative pressure.

That is, the ECU 11 controls the throttle (TPS) in the closing direction by decreasing the required torque used in the compressor 13 through the A/C cut control, recovering the negative pressure.

On the other hand, the ECU 11 controls the fuel injection amount by integrating not only the demanded torque of the driver according to the accelerator pedal operation (APS) but also the demanded torque received from auxiliary devices (for example, a compressor, an alternator or the like) of the engine.

The ECU 11 reflects the required torque required for the operation of the air conditioner (A/C) set as the default in accordance with the temperature setting (cooling condition) of the driver's air conditioner (A/C) to the total required torque, the opening amount of the throttle (TPS) is compensated.

In the following description according to the exemplary embodiment of the present invention, the ECU 11 controls the A/C duty variable control according to the negative pressure recovery entry control in the negative pressure state before entering the A/C cut of the controller 17, and receives the reduced demand torque. At the instant time, the ECU 11 immediately supports the interlocking control of the negative pressure recovery mode in which the fuel injection quantity is decreased and the throttle (TPS) is controlled in the closing direction thereof.

The air conditioner (A/C) is an air conditioner of the vehicle. The air conditioner (A/C) variably controls the partial load of the compressor for preventing the brake negative pressure from dropping down to the A/C cut level in the ECU 11 which is a main constituent of variable torque control.

To the present end, the air conditioner (A/C) includes the compressor control logic for facilitating the variable control of the compressor to operate efficiently according to the driving information related to the vehicle and the environmental conditions.

The air conditioner (A/C) includes an operation information detector 12, a compressor 13, a condenser 14, an evaporator 15, a memory 16 and a controller 17. The air conditioner A/C is operated for cooling, ventilation and heating in the vehicle.

The air conditioner (A/C) improves the cooling performance as the operating ratio of the compressor 13 increases, and the operation ratio of the compressor 13 is determined according to the variable A/C duty control of the controller 17 according to the determination of the shortage of the negative pressure of the intake manifold based on the operation information.

The operation information detector 12 detects operation information measured by various sensors and various controllers according to the driving state of the vehicle. Here, the operation information may be data measured from the sensor and the controller, or information processed in a form necessary for the control of the compressor 13.

For example, the operation information detector 12 can provide values detected from a vehicle speed sensor, an atmospheric pressure sensor, an intake manifold pressure sensor, a speed change stage, an Accelerator Pedal Sensor (APS), a Brake Pedal Sensor (BPS), an altitude sensor, an inclination sensor, a timer etc., to the controller 17.

The compressor 13 compresses the refrigerant drawn in from the evaporator 15 during operation of the air conditioner (A/C) and delivers the compressed refrigerant to the condenser 14. The compressor 13 may include a variable capacity compressor for a vehicle which generates pressure through a piston operation of a cylinder utilizing the power of the engine transmitted through a belt. For example, the compressor 13 may include a pressure regulator configured for changing the angle of the swash plate (sprocket) according to the applied A/C duty control signal and adjusting the actuation rate of the piston (that is piston momentum).

The condenser 14 condenses and liquefies the refrigerant compressed by the compressor 13.

The evaporator 15 vaporizes the refrigerant liquefied by the condenser 14.

Besides, the description of the basic configuration of the air conditioner (A/C) is well-known to those skilled in the art, so unnecessary explanation is omitted.

The memory 16 stores a program and data for controlling the compressor 13, and stores data generated according to the operation.

The memory 16 stores a full automatic temperature control (FATC) based target duty control map MAP1 for control of the compressor 13.

Furthermore, the memory 16 can set and store A/C duty control map MAP2 for variable control of the compressor 13 and a required torque control map MAP3 corresponding to the A/C duty control map MAP2 in the situation of insufficient negative pressure of the intake manifold.

The controller 17 is an air conditioning controller for controlling the overall operation of the air conditioner (A/C), and enters the negative pressure recovery mode in accordance with the brake negative pressure condition in conjunction with the ECU 11 to variably control the compressor 13.

The controller 17 detects the operation of the air conditioner (A/C ON/OFF), the vehicle speed, the atmospheric pressure, the intake manifold pressure, the accelerator pedal operation state (APS ON/OFF), the operation of the brake (BPS ON/OFF), the altitude, the road gradient, the timer, and the like through the operation information detector 12.

The controller 17 controls the compressor 13 in the basic A/C duty according to the general FATC-based air conditioning control when the air conditioner is operated (A/C ON).

The controller 17 determines the negative pressure of the intake manifold stored in the brake booster at a value obtained by subtracting the pressure of the intake manifold from the atmospheric pressure detected by the operation information.

The controller 17 can perform the negative pressure recovery control for controlling the A/C duty to the minimum (min) when the entering of the air conditioner operation stop (A/C cut) is predicted due to insufficient negative pressure of the intake manifold. Here, the minimum (min) control of the A/C duty means that the A/C duty is reduced to 35%, which is the minimum allowable value at which the operation of the air conditioner (A/C) is not stopped (OFF) when the maximum (max) A/C duty is 100%.

Figure 4:
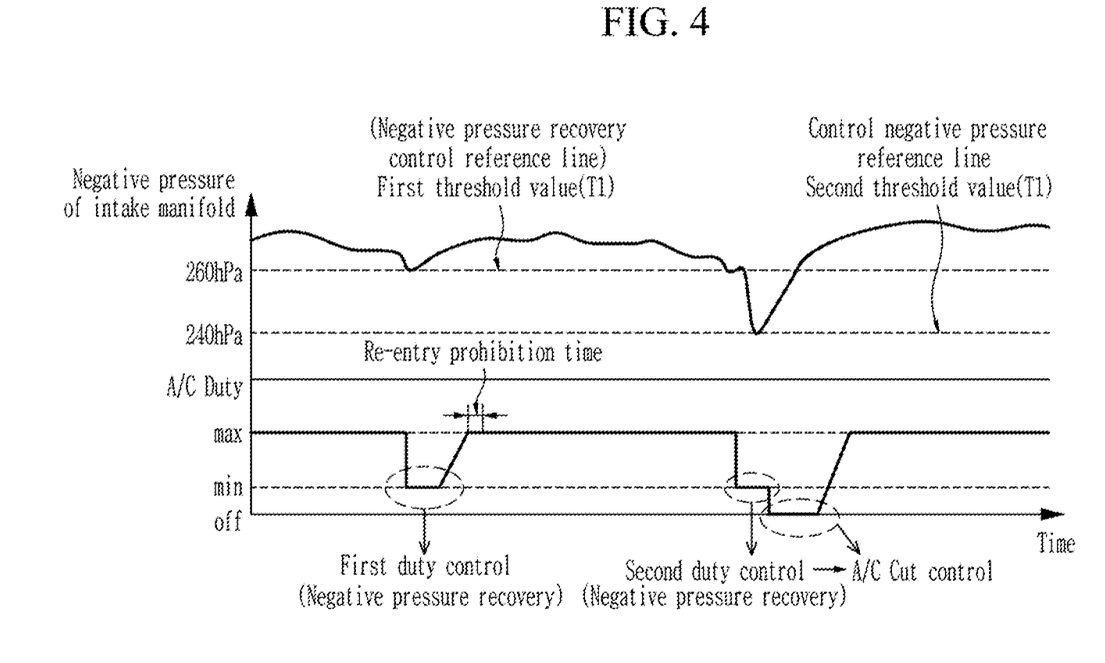
FIG. 4 shows an example of the negative pressure recovery mode entry condition and the A/C duty control according to an exemplary embodiment of the present invention.

For example, FIG. 4 illustrates a negative pressure recovery mode entry condition and an A/C duty control example according to an exemplary embodiment of the present invention.

Referring to FIG. 4, the controller 17 according to the exemplary embodiment of the present invention graphically displays the result of performing the A/C duty control by entering the negative pressure recovery mode according to the variation of the negative pressure of the intake manifold over time.

The controller 17 controls the compressor 13 to a general FATC target duty-based basic A/C duty.

When the negative pressure of the intake manifold falls below the first threshold value T1, the controller 17 enters the negative pressure recovery mode when the negative pressure may be recovered through the A/C duty control, and the A/C duty is reduced without the A/C cut, the negative pressure may be recovered (raised).

Here, the first threshold value T1 (for example, 260 hPa) means a value set as an A/C duty control start condition for preventing A/C cut with a negative pressure recovery control reference line indicating a state in which the negative pressure of the intake manifold is insufficient.

Furthermore, the second threshold value T2 (for example, 240 hPa) is the A/C cut control negative pressure reference line, and when the negative pressure of the intake manifold falls below the second threshold value, the A/C cut control is started.

That is, the first threshold value T1 (for example, 260 hPa) may be set to be a higher value than the second threshold to start the A/C duty control for predicting a negative pressure condition in which the negative pressure of the intake manifold decreases below a second threshold value T2 (for example, 240 hPa) which is an A/C cut control condition and preventing it.

The controller 17 controls the basic A/C duty to a maximum (max) value when the negative pressure of the intake manifold is in excess of the first threshold T1 and the negative pressure is sufficient.

When the negative pressure of the intake manifold falls below the first threshold value T1, the controller 17 starts the negative pressure recovery control like the first duty control to change the A/C duty to the minimum (min). At the instant time, the controller 17 applies the A/C duty control signal varying the maximum (max) A/C duty to the minimum (min) A/C duty to the compressor 13, and then the maximum A/C duty is maintained for a predetermined time period (e.g., 3 seconds) and then returned to the maximum (max).

Thus, the controller 17 can change the output of the compressor 13 to the minimum (min) A/C duty to reduce the engine load and induce an increase in the negative pressure of the intake manifold.

Figure 5:
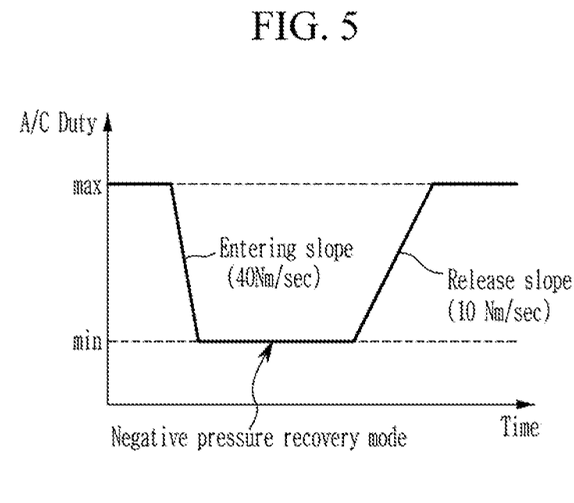
FIG. 5 shows an A/C duty control slope at the time of entering/exiting negative pressure recovery mode according to an exemplary embodiment of the present invention.

Meanwhile, FIG. 5 shows the A/C duty control slope at the time of entering/exiting the negative pressure recovery mode according to the exemplary embodiment of the present invention.

Referring to FIG. 5, the controller 17 can gently control the fluctuation speed of the release slope (e.g., 10 Nm/sec) for returning the A/C duty to the maximum (max) upon entering the negative pressure recovery control compared with the fluctuation speed of the entering slope (e.g., 40 Nm/sec) for lowering the A/C duty to the minimum (min). This is to prevent the RPM from becoming unstable when the variable speed is too fast or too slow when the negative pressure recovery control is entered or released.

Referring again to FIG. 4, after the controller 17 performs the primary duty control and then returns to the basic A/C duty control, and the controller 17 prohibits (restricts) re-entry into the negative pressure recovery mode within a predetermined re-entry prohibition time period (e.g., 0.2 sec). This is to prevent the phenomenon that the minimum (min) A/C duty is maintained continuously exceeding the time period.

As such, the controller 17 can enter the secondary duty control when the negative pressure of the intake manifold drops again to the first threshold value T1 or less after the re-entry prohibition time period. At the instant time, the controller 17 can maintain the minimum (min) duty control during the time period without releasing it immediately even if the releasing condition is satisfied before the minimum (min) duty control time period after entering the negative pressure recovery mode. However, the controller 17 can immediately release the negative pressure recovery mode when the air conditioner (A/C) is turned off before the elapse of the time period.

Meanwhile, the controller 17 can generate the required torque control amount corresponding to the fluctuation in the minimum A/C duty and transfer it to the ECU 11 of the engine.

Figure 6:
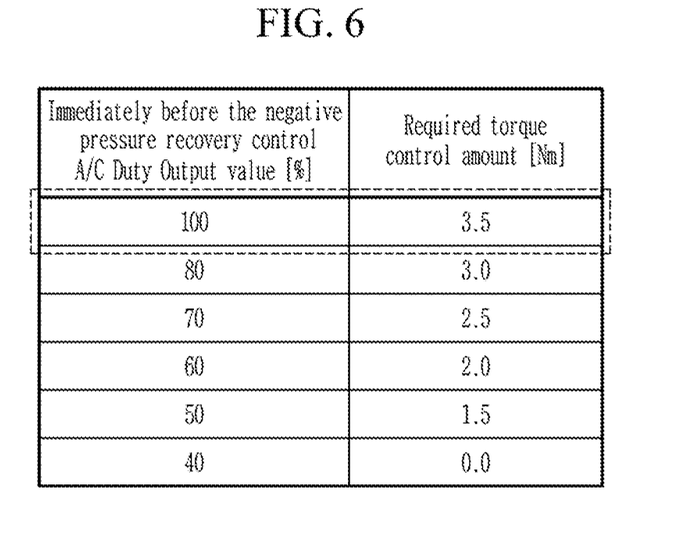
FIG. 6 shows a first required torque control table according to an exemplary embodiment of the present invention.

FIG. 6 shows a first required torque control table according to an exemplary embodiment of the present invention.

Referring to FIG. 6, the first required torque control table according to the exemplary embodiment of the present invention quantitatively and differently set and store the first required torque control amount which may be reduced to the minimum (min) output corresponding to the A/C duty output value level immediately before entering the A/C duty control mode.

The A/C duty output value immediately before the negative pressure recovery control is an output value of the compressor 13 by the angle of the swash plate, and the angle of the swash plate is set stepwise according to the temperature condition of the air conditioner (A/C). The stepwise output values may be detected in accordance with the pressure difference according to the indoor/outdoor temperature. For example, even when the angle of the swash plate is 100%, the required torque may be detected as 20 Nm, 15 Nm or 10 Nm depending on the external environment.

The required torque control amount means the required torque value of the air conditioner (A/C) which may be reduced when the A/C duty maximum output value (max) is reduced to the minimum (min) output for each of the inclination angle conditions.

For example, if the required torque is equal to 10 Nm/s when the inclination plate angle for the maximum (max) A/C duty output immediately before the negative pressure recovery control is 100%, the controller 17 subtracts the first required torque control amount 3.5 Nm according to the A/C duty reduction control and can deliver the required torque reduced to 6.5 Nm to the ECU 11.

In the first required torque control table, the first required torque control amount decreases as the A/C duty output value immediately before entering the A/C duty control mode decreases, and at the constant level where the A/C duty output value is 40%, the first required torque control amount to be 0 to ensure stability.

Figure 7:
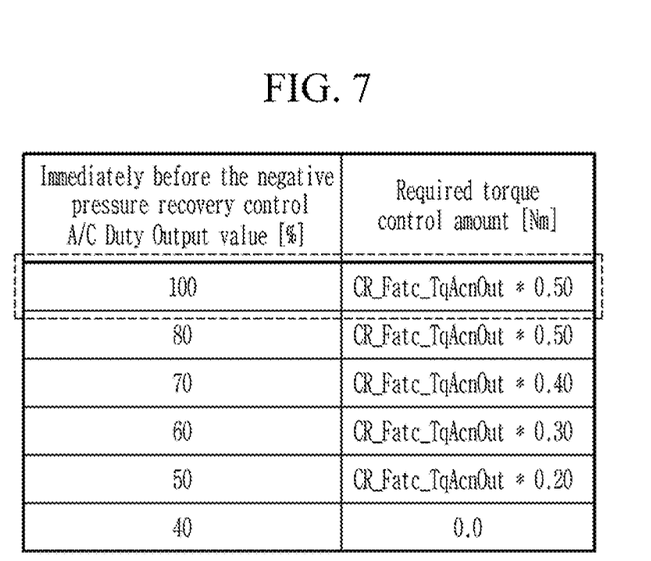
FIG. 7 shows a second required torque control table according to an exemplary embodiment of the present invention.

Furthermore, FIG. 7 shows a second required torque control table according to an exemplary embodiment of the present invention.

Referring to FIG. 7, the second required torque control table according to the exemplary embodiment of the present invention proportionally and differently set and store the second required torque control amount which may be reduced to the minimum (min) output corresponding to the A/C duty output value level immediately before entering the A/C duty control mode.

That is, the second required torque control table differs from the first required torque control table in that the required torque change amount is determined to be varied by a predetermined ratio instead of a predetermined fixed value.

For example, if the required torque is 10 Nm/s when the A/C duty output value before the negative pressure recovery control is 100% based on the general FATC target duty, the controller 17 can multiply the ratio of the corresponding item by 0.50 and transmit the required torque reduced to 5 Nm/s to the ECU 11.

Furthermore, the controller 17 compares the first required torque control amount (e.g., 3.5 Nm) derived through the first required torque control table and the second required torque control amount (e.g., 5 Nm/s) derived through the second required torque control table, and can select a large value and transmit the reduced demand torque to the ECU 11.

In the above description, the first required torque table and the second required torque table are each an example, and the numerical values of the respective items are not limited thereto, and may be changed and set as a control map through the type of vehicle, the type of shift, examination, learning and statistics.

Meanwhile, referring to FIG. 3, the controller 17 can control the negative pressure recovery mode only when the negative pressure may be recovered through the A/C duty control in consideration of the operation information collected in the flatland condition.

For example, when the negative pressure recovery is possible, it may be determined by referring to the following operation conditions.

The controller 17 enters the negative pressure recovery mode when the air conditioner operation (A/C ON) is performed, the vehicle is not stopped at a low speed condition (for example, 0.1 kh=vehicle speed=15 kph), equal to or less than the first threshold value T1 in which the negative pressure of the intake manifold is insufficient, the accelerator pedal is not actuated (APS=OFF) and the brake is active. Here, since the recovery speed of the negative pressure is greater than the predetermined speed and the speed of the vehicle is lower than the predetermined speed, the recovery speed is slow and the A/C cut is frequently generated. Therefore, the low speed condition is set to overlap the speed section with the negative pressure recovery control.

However, the controller 17 can restrict the entry into the negative pressure recovery mode exceptionally when the vehicle is in a condition of driving uphill, which requires a high output of a predetermined gradient (e.g., 18 degrees) in consideration of the mounting conditions. Furthermore, in the exceptional situation, the compressor 13 may be controlled based on the general FATC target duty.

Furthermore, the controller 17 can restrict entry into the negative pressure recovery mode exceptionally if the vehicle is at a highland (for example, 1500 m) or more in consideration of the highland condition. This is because the number of times of support (performance) is reduced to almost half at the highland of about 1500 m or more, assuming that the negative pressure storage amount of the brake booster supports five times operation of the normal reference brake with reference to flatland.

However, the controller 17 can shorten the entry point of the negative pressure recovery control more rapidly by setting the first threshold T1 to be higher as the altitude of the elevation increases in a flatland/lowland condition of less than about 1500 m due to the nature of the negative pressure being affected by elevation above sea level. For example, when the altitude of the elevation is the first altitude, when the first threshold is set to 260 hPa, the first threshold may be variably set to 280 hPa when the altitude is the second altitude higher than the first altitude.

Furthermore, the controller 17 can perform the negative pressure recovery control if the fluctuation speed of the negative pressure detected during a predetermined time period (for example, 10 ms units) exceeds the third threshold value T3, which is set as the sudden fluctuation condition even if the first threshold value T1 is not satisfied. Also, as the variation rate increases, the first threshold value T1 may be set to be higher. Thus, it is possible to perform preemptive negative pressure recovery control according to the moving speed of the negative pressure.

Meanwhile, a method for controlling a compressor according to an exemplary embodiment of the present invention will be described with reference to FIG. 8 based on the configuration of the system for controlling the compressor 10 described above. However, the detailed configuration of the system for controlling the compressor 10 may be subdivided into individual functions or integrated into one system. Therefore, in describing the method for controlling the compressor through FIG. 8, the subject will be referred to as the system for controlling the compressor 10.

Figure 8:
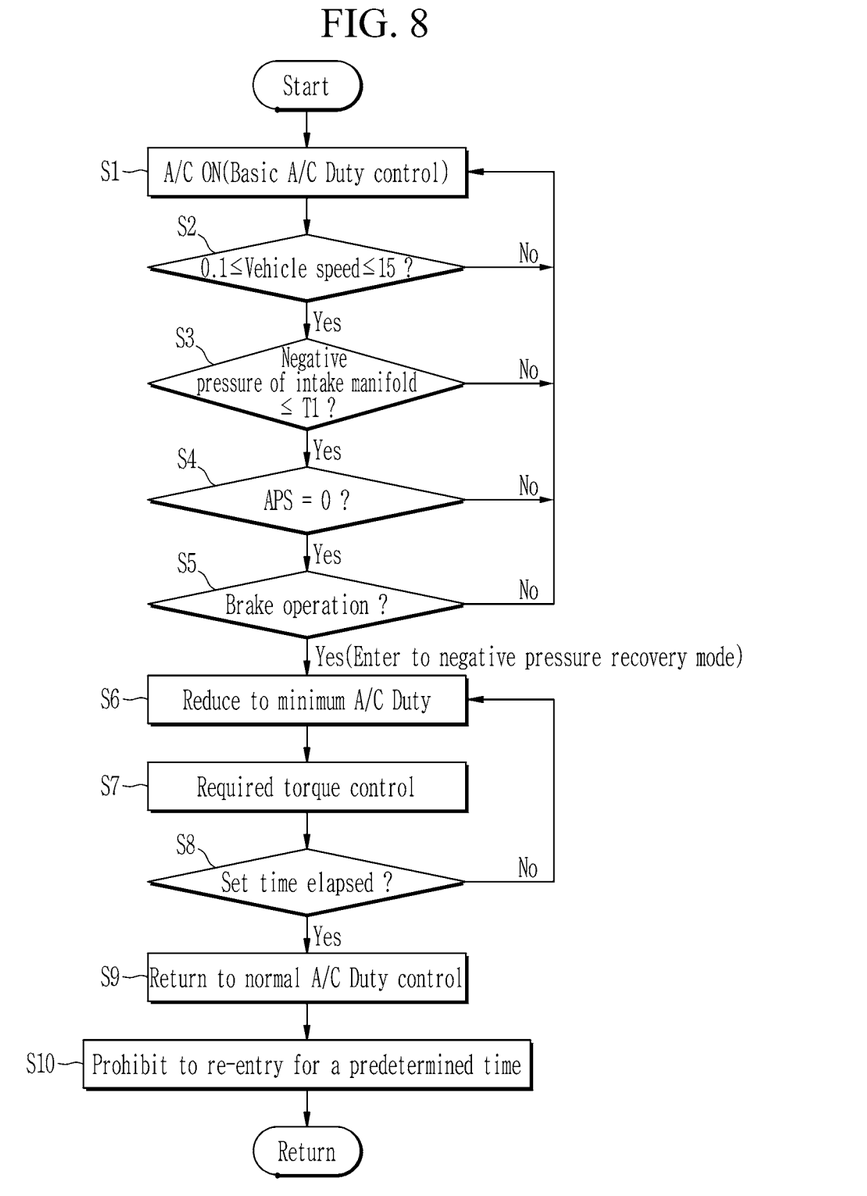
FIG. 8 is a flowchart schematically illustrating a method for controlling a compressor according to an exemplary embodiment of the present invention.

FIG. 8 is a flowchart schematically illustrating a method for controlling a compressor according to an exemplary embodiment of the present invention.

Referring to FIG. 8, in the system for controlling the compressor according to an exemplary embodiment of the present invention, when the air conditioner is operated (A/C ON) S1, the compressor 13 is controlled with the basic A/C duty set based on the general FATC based target duty.

The system for controlling the compressor 10 collects driving information according to the running of the vehicle through the operation information detector 12 and monitors the entry condition to the negative pressure recovery mode based on the prediction of the negative pressure insufficient state of the intake manifold as shown in steps S2 to S5 below.

The system for controlling the compressor 10 predicts the negative pressure insufficient state of the intake manifold and enters the negative pressure recovery mode if the vehicle is traveling at a low speed condition (for example, 0.1 km/h=vehicle speed=10 km/h) (S2; YES), the negative pressure of the intake manifold is insufficient below the first threshold value (260 hPa) (S3: YES), the accelerator pedal is not operated (APS=OFF) (S4; YES), and the brake is actuated (BPS=ON) (S5: YES). In other words, when the negative pressure recovery mode is entered under the AND condition that satisfies all of the steps S2 to S5, and if any of S2 to S5 is not satisfied (NO), the negative pressure recovery mode is not entered The system for controlling the compressor 10 reduces the basic A/C duty due to the entry into the negative pressure recovery mode to the minimum A/C duty for a predetermined time period (e.g., 3 seconds), and performs negative pressure recovery control to reduce engine load S6.

Meanwhile, when only the A/C duty is reduced by the negative pressure recovery control, the actual engine load is reduced, but the ECU 11 does not know to what degree the torque used in the compressor 13 is, so that the negative pressure recovery effect may be insignificant.

Therefore, the system for controlling the compressor 10 determines the required torque reduction amount of the compressor 13 according to the A/C duty reduction simultaneously with the A/C duty reduction control at the time of entering the negative pressure recovery mode and sends it to the ECU 11. The required torque control is performed S7.

At the instant time, the system for controlling the compressor 10 subtracts the first required torque control amount correspondingly set in accordance with the level of the first required torque control table (refer to FIG. 6) from the A/C duty output value immediately before the negative pressure recovery control, and the lowered required torque may be sent to the ECU 11.

Or, the system for controlling the compressor 10 subtracts the second required torque control amount set to fluctuate by a predetermined ratio in accordance with the level of the second required torque control table (refer to FIG. 7) from the A/C duty output value immediately before the negative pressure recovery control, and the lowered required torque may be sent to the ECU 11.

Or, the system for controlling the compressor 10 determines the first required torque control amount and the second required torque control amount and subtracts a larger value from the A/C duty output value immediately before the negative pressure recovery control, and the lowered required torque may be sent to the ECU 11.

The system for controlling the compressor 10 causes the ECU 11 to reduce or close the throttle opening (TPS) through the required torque control, accordingly, there is an effect that the negative pressure of the intake manifold which is the difference between the atmospheric pressure and the intake manifold pressure is increased.

On the other hand, the system for controlling the compressor 10 counts the time period of the negative pressure recovery mode, and when the set time (for example, 3 seconds) has elapsed (S8; YES), the entry into the negative pressure recovery mode is canceled and the routine returns to the normal A/C duty control S9.

Thereafter, the system for controlling the compressor 10 prohibits re-entry into the negative pressure recovery mode within a predetermined re-entry prohibition time period (e.g., 0.2 second) after returning to the general A/C duty control (S10)

Furthermore, the system for controlling the compressor 10 may exceptionally restrict entry into the negative pressure recovery mode if the vehicle is in a condition of driving uphill, which requires a high output of a predetermined degree of inclination (e.g., 18 degrees) or more.

Furthermore, the system for controlling the compressor 10 may exceptionally limit entry into the negative pressure recovery mode if the vehicle is at a highland above a certain altitude (e.g., 1500 m).

Like this, according to an exemplary embodiment of the present invention, it is possible to reduce the frequency of A/C cut due to insufficient negative pressure of the intake manifold by detecting the condition that the negative pressure of the intake manifold is insufficient, securing the negative pressure of the intake manifold through the pre-A/C duty reduction control and the reduction of the required torque.

Furthermore, the braking performance may be improved by controlling the A/C duty reduction control when the engine enters the negative pressure recovery mode and adjusting the variable torque demand value and the variable speed of the A/C duty of the compressor, increasing the negative pressure of the intake manifold.

Furthermore, by omitting the brake booster sensor and using the difference between the atmospheric pressure and the pressure of the intake manifold, it is possible to reduce the cost increase and improve the customer satisfaction by improving the trade-off relationship between the cooling performance and the brake performance.

While the present invention has been particularly shown and described with reference to exemplary embodiments thereof, the present invention is not limited to the above-described embodiments, and various other changes and additions are possible.

For example, in the exemplary embodiment of the present invention shown in FIG. 8, the entry condition to the negative pressure recovery mode is referred to as an AND condition that satisfies all the steps S2 to S5 including the state in which the brake is activated (BPS=ON).

However, the exemplary embodiment of the present invention is not limited to this, and during the predetermined time (Brake Entry_Time) after the brake is turned off after the re-entry prohibition time period in the step S10, if the steps S2 through S4 are satisfied regardless of the brake operation, the negative pressure recovery mode may be entered.

Figure 9:
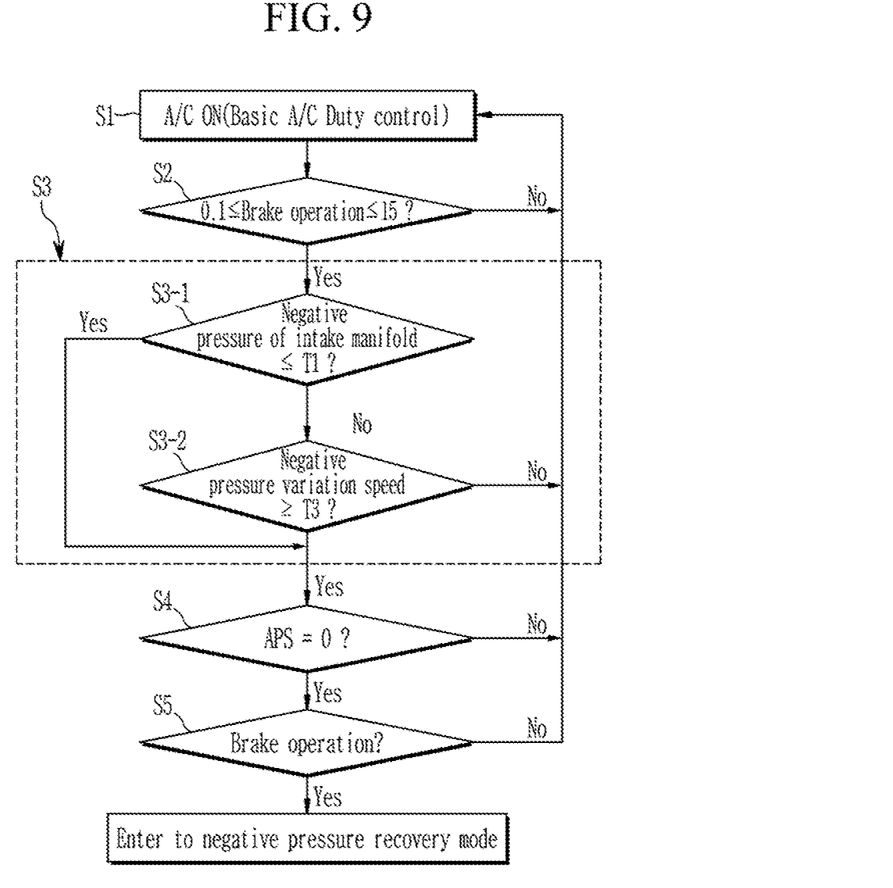
FIG. 9 is a flowchart schematically illustrating an entry condition into a negative pressure recovery mode according to various exemplary embodiments of the present invention.

FIG. 9 is a flowchart schematically illustrating an entry condition into a negative pressure recovery mode according to various exemplary embodiments of the present invention.

Referring to FIG. 9, since an entry condition into a negative pressure recovery mode according to various exemplary embodiments of the present invention is similar to that of FIG. 8 described above, a description of the entry to the negative pressure recovery mode will be omitted and the difference S3 will be mainly described.

The system for controlling the compressor 10 can determine that the negative pressure recovery control condition is satisfied if the fluctuation rate of the negative pressure of the engine detected for a predetermined time period (e.g., 10 ms unit) is equal to or greater than the third threshold value (S3-2; YES) even if the condition that the negative pressure of the intake manifold is not higher than the first threshold value (260 hPa) is not satisfied (S3-1: NO).

At the instant time, the system for controlling the compressor 10 has an advantage that the time point of entry of the negative pressure recovery control may be shortened more rapidly by setting the first threshold value T1 to be higher as the fluctuation speed becomes higher.

The above-described exemplary embodiment of the present invention may not be realized by an apparatus and a method described above, but it may also be realized by a program that realizes functions corresponding to configurations of the exemplary embodiment or a recording medium that records the program. Such a realization may be easily performed by a person skilled in the art.

While the present invention has been described in connection with what is presently considered to be practical exemplary embodiments of the present invention, it is to be understood that the present invention is not limited to the disclosed exemplary embodiments of the present invention, but, On the other hand, is directed to cover various modifications and equivalent claims as well as various alternatives and modifications thereof. It is intended that the scope of the present invention be defined by the Claims appended hereto and their equivalents."

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling a compressor of a vehicle, the system comprising:
    an engine controller (ECU) that controls a fuel injection amount corresponding to an engine load and an opening amount of a throttle according to a required torque required for an air conditioner (A/C);
    an operation information detector connected to the ECU and configured for detecting operation information according to a driving state of the vehicle;
    a compressor that generates pressure through operation of a piston in a cylinder utilizing power of an engine during operation of the A/C; and
    a controller which is connected to the ECU and determines a negative pressure stored in a brake booster at a value obtained by subtracting an intake manifold pressure from atmospheric pressure detected by the operation information detector,
    wherein while the negative pressure is below a first threshold value when a brake is operated, the controller enters a negative pressure recovery mode for a negative pressure drop condition that falls below a second threshold value which is an A/C cut control condition and reduces an A/C duty of the compressor, and
    wherein the controller enters the negative pressure recovery mode when a fluctuation rate of the negative pressure detected during a predetermined time period is changed to be equal to or greater than a third threshold value when a condition in which the negative pressure is not more than the first threshold value is not satisfied.

2. The system for controlling the compressor of the vehicle of claim 1, wherein the compressor includes a pressure regulator for regulating an operation rate of the piston by changing an angle of a swash plate in accordance with an A/C duty control signal applied from the controller.

3. The system for controlling the compressor of the vehicle of claim 1, further including:
    a memory for storing an A/C duty control map for variable A/C duty control of the compressor and a required torque control map corresponding to the A/C duty control map in a case that negative pressure in the intake manifold is below a threshold value.

4. The system for controlling the compressor of the vehicle of claim 1, wherein the operation information detector detects at least one operation information among air conditioner operation state, vehicle speed, the atmospheric pressure, the intake manifold pressure, accelerator pedal operation state, brake operation state, altitude, road inclination, and a timer.

5. The system for controlling the compressor of the vehicle of claim 1, wherein the controller enters the negative pressure recovery mode when the vehicle is running at a speed lower than a predetermined vehicle speed at which the vehicle is not completely stopped based on the detected operation information, the negative pressure lower than the first threshold value, an accelerator pedal is not operated, and the brake is operated.

6. The system for controlling the compressor of the vehicle of claim 1, wherein the controller reduces a basic A/C duty of the compressor according to entry into the negative pressure recovery mode to a minimum A/C duty of the compressor for a predetermined time period to reduce the engine load and then returns to the basic A/C duty.

7. The system for controlling the compressor of the vehicle of claim 6, wherein the controller controls a variation rate of a release slope returning to the basic A/C duty compared to a change rate of an entering slope which is reduced to the minimum A/C duty during a present time upon entering the negative pressure recovery mode.

8. The system for controlling the compressor of the vehicle of claim 6, wherein the controller prohibits re-entry into the negative pressure recovery mode within a predetermined re-entry prohibition time period after returning to the basic A/C duty.

9. The system for controlling the compressor of the vehicle of claim 1, wherein the controller performs a required torque control to determine a required torque reduction amount of the compressor with an A/C duty reduction control and sends the determined required torque reduction amount to the ECU when entering the negative pressure recovery mode.

10. The system for controlling the compressor of the vehicle of claim 9, wherein the controller, by referring to a first required torque control table in which the required torque control amount which is reduced to a minimum output is quantitatively different in correspondence with an output value for each A/C duty before entering the negative pressure recovery mode, outputs a reduced torque demand to the ECU by subtracting a first required torque control amount from the output value for each A/C duty.

11. The system for controlling the compressor of the vehicle of claim 10, wherein the controller, by referring to a second required torque control table in which the required torque control amount that is reduced to the minimum output is quantitatively different in correspondence with the output value for each A/C duty before entering the negative pressure recovery mode, outputs the reduced torque demand to the ECU by subtracting a second required torque control amount from the output value for each A/C duty.

12. The system for controlling the compressor of the vehicle of claim 11, wherein the controller selects a larger value among the first required torque control amount and the second required torque control amount, and transmits the reduced torque demand to the ECU.

13. The system for controlling the compressor of the vehicle of claim 1, wherein the controller restricts an entry into the negative pressure recovery mode when the vehicle is in a state of driving uphill at a predetermined inclination or more or at a highland higher than a predetermined altitude.

14. The system for controlling the compressor of the vehicle of claim 1, wherein the controller shortens an entry point of the negative pressure recovery mode by variably setting the first threshold value to increase as an altitude at which the vehicle is located at a flatland below a predetermined altitude.

15. A method for controlling a compressor of a vehicle according to a brake negative pressure condition of a vehicle compressor control system, the method comprising:
a) controlling, by a controller, the compressor with a set basic A/C duty when an air conditioner (A/C) of the vehicle is operated;
b) determining, by the controller, a negative pressure stored in a brake booster at a value obtained by collecting operation information according to a running state of the vehicle and subtracting an intake manifold pressure from an atmospheric pressure;
c) entering, by the controller, a negative pressure recovery mode when braking operation is in a state where the negative pressure is less than a first threshold value; and
d) performing, by the controller, a negative pressure recovery control for reducing an engine load by reducing the basic A/C duty according to an entry into the negative pressure recovery mode to a minimum A/C duty for a predetermined time period,
wherein the step c) further includes:
entering the negative pressure recovery mode when a fluctuation rate of the negative pressure detected during a predetermined time period is changed to be equal to or greater than a second threshold value when a condition in which the negative pressure is not more than the first threshold is not satisfied.

16. The method for controlling the compressor of the vehicle of claim 15, wherein the step c) includes:
entering the negative pressure recovery mode when the vehicle is running at a speed lower than a predetermined vehicle speed at which the vehicle is not completely stopped based on the collected operation information, an accelerator pedal is not operated, and a brake is operated.

17. The method for controlling the compressor of the vehicle of claim 15, wherein the step d) includes:
performing a required torque control to determine a required torque reduction amount of the compressor with a A/C duty reduction control and sending the determined required torque reduction amount to an engine control unit (ECU) connected to the controller when entering the negative pressure recovery mode.

18. The method for controlling the compressor of the vehicle of claim 17, wherein performing the required torque control includes:
subtracting a first required torque control amount which is quantitatively differentiated according to an output value for each A/C duty before entering the negative pressure recovery mode, from the output value for each A/C duty, and transmitting the torque reduction amount to the ECU; or
subtracting a second required torque control amount which is proportionally differentiated according to the output value for each A/C duty before entering the negative pressure recovery mode, from the output value for each A/C duty, and transmitting the torque reduction amount to the ECU or
determining the first required torque control amount and a second required torque control amount, subtracting a larger value therefrom, and transmitting the torque reduction amount to the ECU.

19. The method for controlling the compressor of the vehicle of claim 17, further including:
after the step d),
canceling the entry of the negative pressure recovery mode and returning to a control of the basic A/C duty after the predetermined time period of the negative pressure recovery mode has passed;
prohibiting re-entry into the negative pressure recovery mode within a predetermined re-entry prohibition time period after returning to the control of the basic A/C duty control; and
entering the negative pressure recovery mode when the negative pressure is less than the first threshold value regardless of the braking operation for a predetermined time period after the re-entry prohibition time period.

* * * * *